B. W. FORREST.
COTTON CHOPPER.
APPLICATION FILED OCT. 7, 1912.
1,059,534.
Patented Apr. 22, 1913.
Fig. 1.
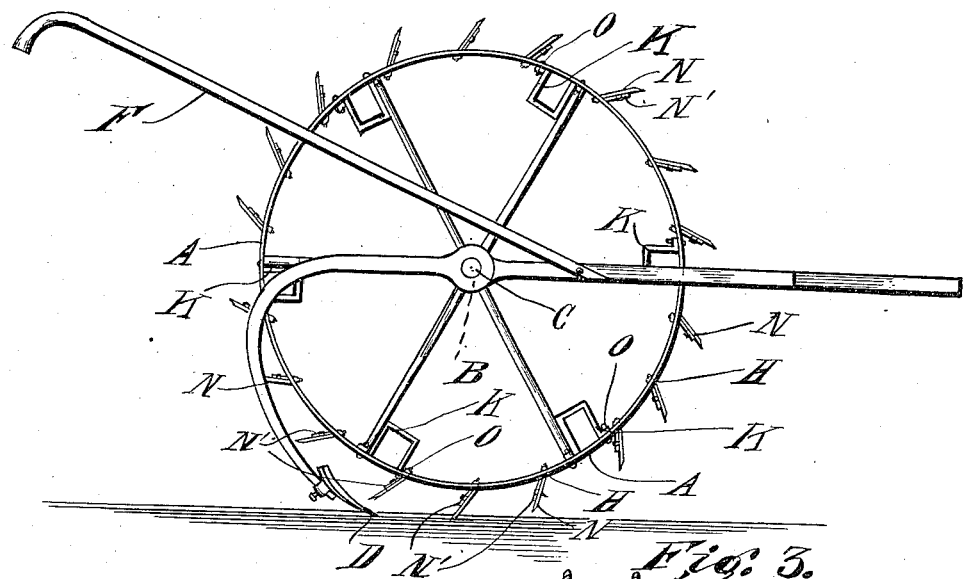
Fig. 3.
Fig. 2.
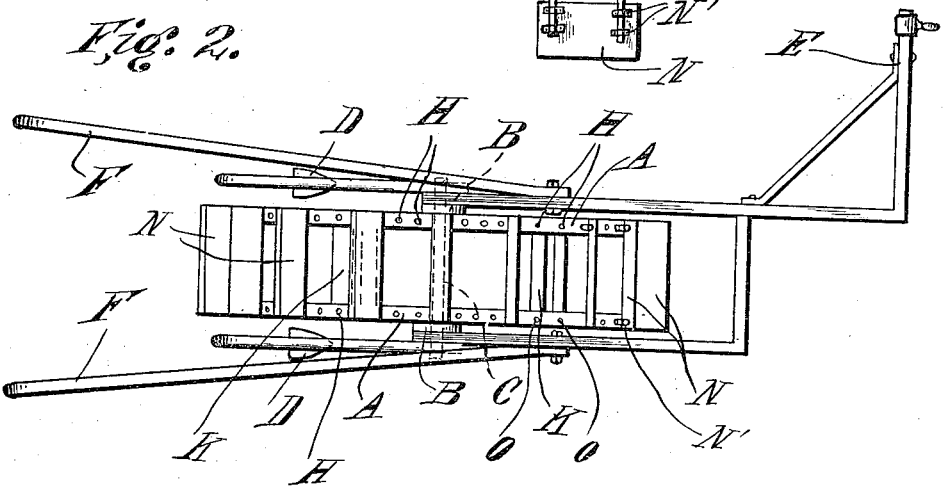
Witnesses
Inventor
B. W. Forrest.
By
Attorney

UNITED STATES PATENT OFFICE.

BEDFORD W. FORREST, OF ATLANTA, TEXAS.

COTTON-CHOPPER.

1,059,534.  Specification of Letters Patent.  Patented Apr. 22, 1913.

Application filed October 7, 1912. Serial No. 724,388.

*To all whom it may concern:*

Be it known that I, BEDFORD W. FORREST, a citizen of the United States, residing at Atlanta, in the county of Cass and State of Texas, have invented certain new and useful Improvements in Cotton-Choppers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cotton choppers and consists essentially in the provision of an apparatus of this nature having two wheel sections spaced apart and upon which are mounted cutting blades disposed at inclinations to the periphery of the wheel and adapted to be held in different adjusted positions accordingly as it may be desired to operate to leave plants at different distances apart.

The invention comprises various details of construction and combinations and arrangements of parts which will be hereinafter fully described, shown in the accompanying drawings and then specifically defined in the appended claim.

I illustrate my invention in the accompanying drawings in which:—

Figure 1 is a side elevation of a cotton chopper made in accordance with my invention, Fig. 2 is a top plan view, and Fig. 3 is a detail view of one of the cutting blades.

Reference now being had to the details of the drawings by letter, A, A designate the two wheel sections mounted upon a single hub B. Said hub is mounted upon an axle C carried by the frame and which latter carries the plows D. A side hitch E is connected to said frame so that the horse connected to the apparatus may not walk upon the row of cotton, and suitable handles F are secured to the frame. Said wheels are provided with series of perforations H spaced apart slight distances, and N designate cutting blades which have bars N' secured thereto which are also perforated and adapted to receive pins passing through the perforations of the bars and heel and serving as means to hold the blades securely in place, bridging the space intermediate the two wheel sections. Each of said blades is preferably set at an inclination, as shown clearly in the side elevation of the drawings, so that, when the wheel sections rotate, the blades will have a tendency to cut the weeds and raise the soil.

Cups, designated by letter K, are adjustably held by means of pins O between the wheel sections at different locations and are adapted to be adjusted to cover plants located at different distances apart and which plants it is desired to protect from the cutting blades and also from the plow.

In operation, it will be noted that the blades may be adjusted at different distances apart through the medium of the pins passing through registering apertures as shown, thus adapting the blades to cut the plants or weeds which are not covered by the cups, the latter serving to protect the plants from the soil as it is thrown up by the plows. The two wheel sections being upon either side of the row will prevent the latter from coming in direct contact with or injuring the plants which it is desired to protect.

What I claim to be new is:—

A cotton chopper comprising a frame, a rotary axle journaled therein, a hub, circular perforated wheel sections fastened to said hub, cross-pieces connecting the sections, cutting blades having eyes thereon, threaded pins fastened to said eyes and passing through the apertures in said wheel sections, and cups adjustably held between the wheel sections, as shown and described.

In testimony whereof I hereunto affix my signature in the presence of two witnesses.

BEDFORD W. FORREST.

Witnesses:
D. HALLDAY,
R. A. HOWE.

Copies of this patent may be obtained for five cents each, by addressing the "Commissioner of Patents, Washington, D. C."